(No Model.)
W. A. STERN.
APPARATUS FOR DETECTING LEAKS IN GAS PIPES.
No. 358,949. Patented Mar. 8, 1887.
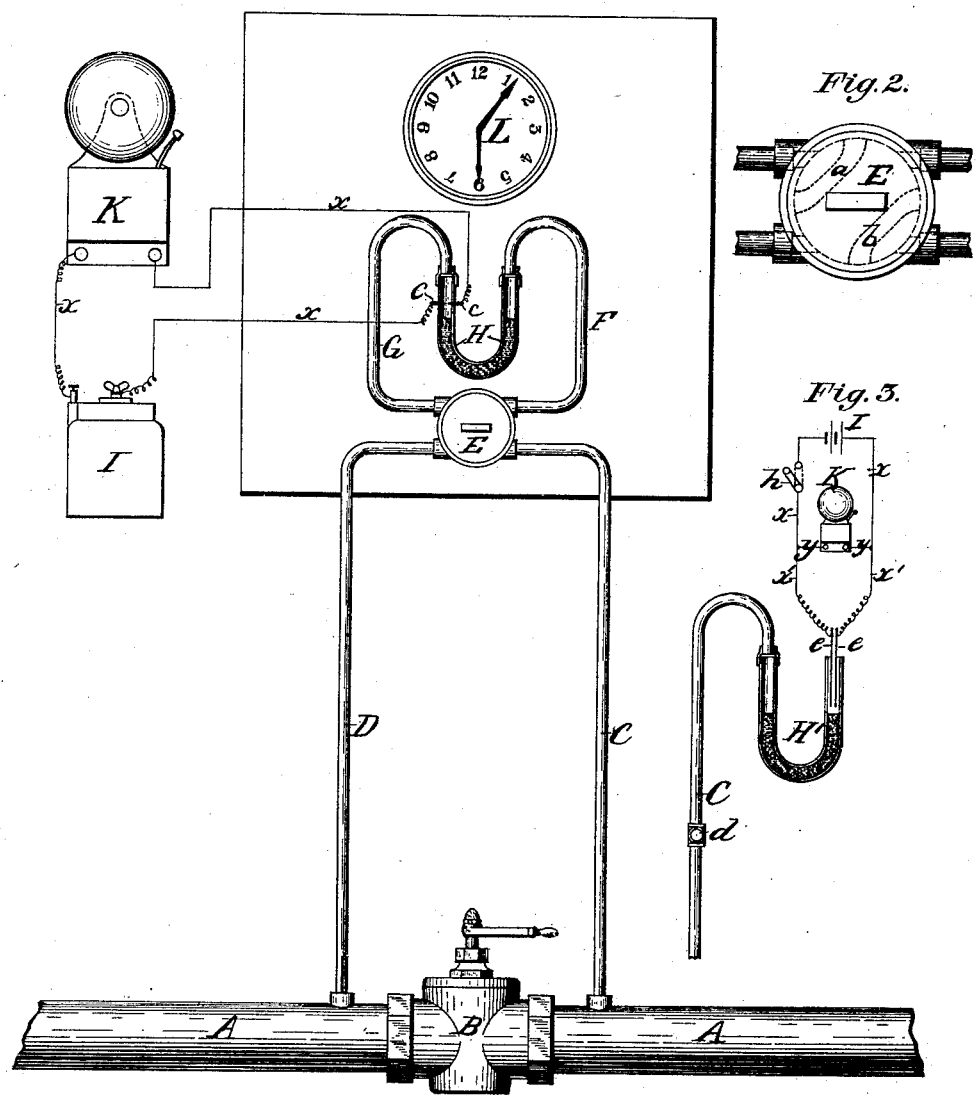
Witnesses.
J. K. Smith
M. B. Conwin
Inventor.
Wm A. Stern

UNITED STATES PATENT OFFICE.

WILLIAM A. STERN, OF ALLEGHENY CITY, PENNSYLVANIA, ASSIGNOR OF ONE-HALF TO ISIDORE COBLENS, OF SAME PLACE.

APPARATUS FOR DETECTING LEAKS IN GAS-PIPES.

SPECIFICATION forming part of Letters Patent No. 358,949, dated March 8, 1887.

Application filed July 7, 1886. Serial No. 207,297. (No model.)

*To all whom it may concern:*

Be it known that I, WILLIAM A. STERN, of Allegheny City, in the county of Allegheny and State of Pennsylvania, have invented a new and useful Improvement in Apparatus for Detecting Leaks in Gas-Pipes; and I do hereby declare the following to be a full, clear, and exact description thereof.

It is well known that great difficulty is experienced in preventing the escape of gas by leakage from the joints and couplings of gas-pipes used for the supply of natural gas, and the danger arising therefrom is enhanced by the comparative freedom of natural gas from any offensive smell and the high pressure at which it is frequently supplied, so that it has not unfrequently happened that serious accidents have occurred from the explosion of this gas when mixed with atmospheric air where its presence has not been detected. My apparatus, however, is equally applicable to cases where artificial gas is used, so that I do not confine my invention to its use with natural gas.

The object of my improvement is to afford a convenient and efficient means of testing the condition of the supply-pipes and their couplings in order to detect any leakage, and is especially designed for use in dwelling-houses and other buildings by persons who are inexperienced in testing the condition of such pipes or detecting leakage therefrom.

In the accompanying drawings, forming part of this specification, Figure 1 is a representation of my apparatus applied to a service-pipe from a gas-main. Fig 2 is a sectional view of one of the cocks used in my apparatus. Fig. 3 is a representation of a modified form of my apparatus.

In the several figures like letters of reference denote similar parts.

In the drawings, Fig. 1, A is the service-pipe, connected at one end with the gas-main in the street and at the other end with the pipes which supply the building with gas. At a point in the pipe A, preferably near to the place where the service-pipe enters the building, is a cock, B, of ordinary construction, for shutting off the supply from the main to the building through the pipe A. Two small gas-pipes, C D, one on each side of the cock B, are connected with the service-pipe A, which pipes extend upward to a four-way cock, E, in my gas-leak detector, the connection of said pipes with the gas-passages $a\ b$ in cock E being shown in Fig. 2. The other openings in each of the gas-passages $a\ b$ connect with short pipes F G. Between the short pipes F and G is placed a mercury gage, H, consisting of a U-shaped tube partially filled with mercury, one of the pipes, F, entering one leg and the other pipe, G, entering the other leg of the gage H, the point of connection of the pipes F and G with the legs of the gage H being hermetically sealed, so as to form a gas-tight joint.

Two platinum points, $c\ c$, are inserted through one of the legs of the U-shaped mercury gage, so as to project slightly into the cavity of the tube at a point slightly above the level of the mercury, and the two wires, $x\ x$, extending from opposite poles of a battery, I, are connected with the external ends of the platinum wires. The battery I may consist of a single cell and be of any ordinary or desired construction.

Interposed in the circuit of the battery I, at any convenient point, is an ordinary electric alarm-bell, K, arranged to strike the alarm whenever the battery-circuit is closed.

A small time-piece, L, may be placed at a convenient point in the frame supporting the gage H and the bell K, the purpose of which will be explained presently.

It will be obvious from the construction described that if the building is supplied with gas through the service-pipe A, the cock B being open, the pressure on each side of the cock B will be uniform and equal, and consequently, if the cock E be also open, the pressure of gas on the surface of the mercury in the gage H will be equal in both legs, and when this is the case the mercury will stand at the same level in both, as shown in Fig. 1. If, however, the gas-pressure should be less on the mercury in the leg of the gage into which the platinum points are inserted, the mercury will rise in that leg and fall in the other. A very slight rise in the mercury will bring it into contact with the platinum points, thus closing the circuit of the battery, and causing the alarm to ring and continue to do so until equilibrium of pressure is restored in the service-pipe A on both sides of the cock B.

The method of using my apparatus is as follows: When it is desired to test the condition of the pipes in the building, all the cocks and valves for escape of gas in the house are first closed, while the cock B remains open. By this means a uniform pressure of gas is attained throughout all the pipes in the building. The cock B is then shut. If there is no leak in the pipes in the building, the pressure will remain the same on both sides of the cock B. If there should be a very slight leak, as there frequently will be—too slight, however, to be a source of danger—the mercury in the leg of the gage H, which is connected with the battery I, will rise, but so slightly as to indicate an immaterial leak. If the level of the mercury in the two legs of the gage changes rapidly, it will indicate a serious leak, and thus the length of time which elapses between the shutting of the cock B and the sounding of the alarm will indicate not only the existence but also the character or extent of the leak. The escape of gas from leaks in the pipes will cause a decrease of pressure on one side of the gage, while the pressure of the gas in the main beyond the cock B will remain substantially unchanged. For this purpose the time-piece L is used, so that the time of shutting the cock B and of the sounding of the alarm may be conveniently noted.

The lapse of time which will indicate a serious leak will depend on the construction of the instrument, and will vary according to the diameter of the pipes, the size of the gage, and the height of the platinum points $c\ c$ above the surface of the mercury when it is at a uniform level in both legs; hence with each instrument directions will be given, permanently marked on the frame, stating the character of the leak indicated by the lapse of given periods of time between the closing of the cock B and the sounding of the alarm.

Fig. 3 shows a modification of my apparatus designed for use by tapping the service-pipe on one side of the cock B only, which I will proceed to describe. A single small gas-pipe, C, rises from the service-pipe A. (Shown in Fig. 1.) On the house side of the cock B a stop-cock, $d$, in the pipe C serves to shut off the gas from the gage. H' is a mercury gage, with the upper end of one leg of which the pipe C is connected. The other leg of the mercury gage, being left unsealed, is exposed to atmospheric pressure. Two platinum wires, $e\ e$, are introduced into the open leg of the mercury gage, so as to nearly touch the surface of the mercury when it is at a uniform level in both legs. These wires $e\ e$ are connected with the battery-wires $x\ x$, one connecting with each pole of the battery. The bell is put in circuit with the battery I by the wires $y\ y$, which are connected with the battery-wires $x\ x$. A switch, $h$, is placed in circuit in the wires $x$, so as to open and close the bell-circuit, if desired.

The operation of this device is as follows: When pressure of gas is in the service-pipe A, the mercury in the gage H' rises, so as to form contact with the wires $e\ e$ and close the circuit of battery I; but, owing to resistance of the electro-magnet coil in the bell K, the current passes through the wires and mercury, short-circuiting the bell K, and thus it is not affected. This is the normal condition of the apparatus when not in use to make a test. When it is desired to test the gas-pipes, all the gas-openings in the building are closed, and then the cock B in the service-pipe is also closed, leaving the pressure on in the service-pipe and the pipes through the building. If there should be a leak in the pipes in the building the pressure in those pipes will diminish, and, the cock $d$ in pipe C being open, the mercury will fall in the leg of gage H', in which the wires $e\ e$ are inserted, thus breaking the battery-circuit through the wires $x'\ x'$ and the wires $e\ e$; but the circuit through the wires $x\ x$ and $y\ y$, in which the bell K is included, is not thereby broken, but the current then passes through the electro-magnet of the bell and sounds the alarm until either the pressure is restored in the gas-pipes or the bell-circuit is opened by the switch $h$.

I have described as part of my improved apparatus an electric bell and battery with its circuit to operate the bell when the pressure in the mercury-gage is reduced by leakage from the pipes in the building; but as the gage itself indicates to those accustomed to the use of such instruments such reduction of pressure by the inequality of height of the mercury in its two legs, my improved apparatus may be used without the battery and bell.

It is my design that the instrument I have described should be used frequently at stated intervals of time, in order that the condition of the pipes as to leakage should be carefully watched.

Having thus described my improvement, what I claim as my invention, and desire to secure by Letters Patent, is—

1. As a device for detecting leakage in gas-pipes in buildings supplied from a main or other source of supply under pressure, the combination, with the service-pipe, of a valve or cock, B, situate in the service-pipe back of the burner cocks or valves for shutting off the gas-supply, and a pressure-gage connected with the service-pipe by a connection entering the same between the cock or valve B and the burner cocks or valves, whereby when the service-pipe is filled with gas and the said valves or cocks are shut to confine the gas between them any leakage of the gas in the service-pipe between said valves or cocks will cause a diminution of pressure on the gage and a consequent indication thereof, substantially as described.

2. As a device for detecting leakage in gas-pipes supplied from a main or other source of supply under pressure, the combination, with the service-pipe and a valve or cock therein for shutting off the gas-supply, of two pipes connected with the service-pipe, one on each side of the cock, and a U-shaped mercury gage, each leg of which is connected gas-tight with one of the pipes leading from the service-pipe, substantially as described.

3. In combination with a service-pipe supplying gas under pressure and having a cock or valve for shutting off and turning on the supply, two pipes connected with the service-pipe, one on each side of the cock, a U-shaped mercury gage, each leg of which is connected gas-tight with one of the pipes leading from the service-pipe, two metallic contact-points inserted into one of the legs of the mercury gage, an electric battery and circuit connected with said contact-points, and an electric bell included in said circuit, substantially as and for the purposes described.

In testimony whereof I have hereunto set my hand this 3d day of July, A. D. 1886.

WILLIAM A. STERN.

Witnesses:
W. B. CORWIN,
JNO. K. SMITH.